Oct. 27, 1925.　　　　　　　　　　　　　　　　　　　　　1,559,035
G. EGLOFF ET AL
PROCESS AND APPARATUS FOR DEHYDRATING EMULSIFIED OILS
Original Filed Nov. 1, 1920
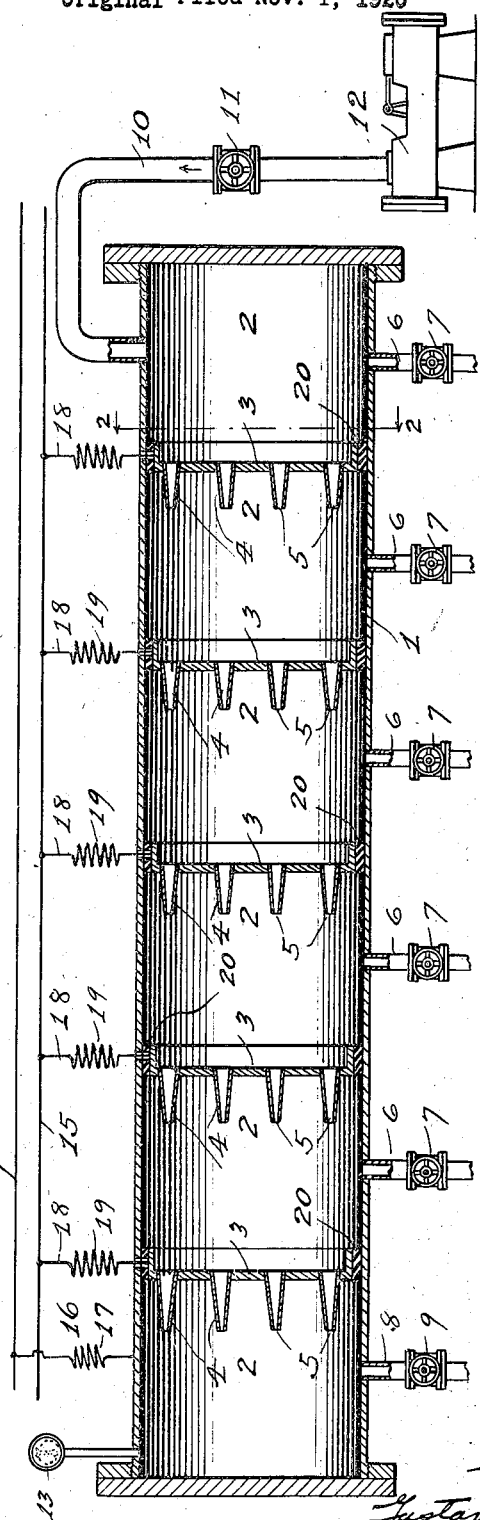
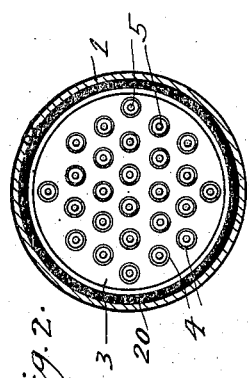
Inventors,
Gustav Egloff
Harry P. Benner
By Frank L. Belknap Patented Oct. 27, 1925.

1,559,035

UNITED STATES PATENT OFFICE.

GUSTAV EGLOFF AND HARRY P. BENNER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA.

PROCESS AND APPARATUS FOR DEHYDRATING EMULSIFIED OILS.

Application filed November 1, 1920, Serial No. 420,881. Renewed March 28, 1925.

*To all whom it may concern:*

Be it known that we, GUSTAV EGLOFF and HARRY P. BENNER, both citizens of the United States, residing in the city of Chicago, county of Cook, and State of Illinois, have invented certain new and useful Improvements in Processes and Apparatus for Dehydrating Emulsified Oils, of which the following is a specification.

This invention relates to improvements in process and apparatus for dehydrating emulsified oils, and consists essentially in a process and apparatus in which the oil is caused to pass through a series of perforated plates under pressure which is regulated and simultaneously subjected to electrical action.

We are aware that heretofore oils have been dehydrated by means of electrical action but there are certain kinds of particularly refractory emulsified California and Mexican crude petroleums which do not readily yield to the action of electricity alone and are very difficult to de-emulsify with electricity alone in the commercially economical manner. We have discovered, however, that by causing the oil to pass through a series of perforated plates under relatively high pressure and simultaneously subjecting the oil as it passes through the plates to electrical action, that a much more effective dehydration takes place. We have also designed a novel form of apparatus for carrying out the process.

In the drawings:

Fig. 1 is a view partly in section and partly in side elevation of an apparatus suitable for carrying out our invention.

Fig. 2 is a transverse sectional view taken through one of the perforated plates.

Referring in detail to the drawings, 1 designates as a whole a suitable container or retort equipped to stand relatively high pressure, as for example, from 25 to 500 pounds or more. This still is divided into a series of compartments 2 by means of the plates or partition members 3 so mounted in the retort as not to be dislodged by oil pressure. Each of the members 3 is provided with a series of tapered conduits or ducts 4, the contracted ends of which form relatively small openings or discharge ports, 5. Preferably the ports 5 are the largest in the righthand plate 3 and of successively decreasing size in the remainder of the plates. Each chamber 2 is provided with a drawoff pipe 6 controlled by throttle valve 7 leading to any suitable receiver (not shown). The last pipe is provided with a drawoff pipe 8 provided with a similar throttle valve 9. The pipe 6 may be used to draw off the water which has settled out of the oil as it passes through the retort and in practice, it will be principally dry oil that will be drawn off through the pipe 8, although if any water does remain, it will be a small amount and will settle out by gravity. Oil is introduced into the first chamber 2 by means of the feed line 10 having throttle valve 11 leading to the oil feed pump 12 connected to any suitable source of supply, such as a storage tank or pipe line. The retort is provided with pressure gauge 13.

Current is adapted to be sent through the oil through the conductors 14 and 15 connected to any suitable source of energy. Conductor 14 is connected by the branch 16 having resistance 17 to the retort. The conductor 15 is connected by the branches 18 having resistance 19 to the perforated plates 3. These plates have their peripheries insulated from the wall of the retort by the annular insulating rings 20. The arrangement is such that local circuit may be sent through each of the foraminated discs. If desired, switches (not shown) may be interposed in each line 18, so that any one or more of them may be cut out of the circuit. Or if desired, the resistance 19 may be made of varying intensity so as to vary the character of the current through each local circuit.

The oil may be delivered to the retort under a pressure of say, 25 to 1000 pounds and slowly forced through the foraminated plates, while at the same time subjected to the electrical current through the means shown. The oil may be introduced at atmospheric pressure and atmospheric temperature if desired, or it may be preheated to say, 200 degrees F. If desired, the retort itself may be mounted in a furnace in an obvious manner and externally heated to a temperature of 200 degrees F. or even higher, depending on the pressure used, it being desirable to avoid vaporizing of the water content to cause the oil to foam when released.

We claim as our invention:

1. A process of dehydrating heated emulsified petroleum oil consisting in passing the oil through a series of spaced foraminated plates, the foraminations being of gradually decreasing size, under pressure and simultaneously subjecting the oil to the action of electrical current as it passes through said plates.

2. A process of dehydrating emulsified petroleum oil consisting in passing the oil through a series of spaced foraminated plates under pressure and simultaneously subjecting the oil to the action of electrical current as it passes through said plates.

3. A process of dehydrating emulsified petroleum oil consisting in passing the oil through a series of spaced foraminated plates and simultaneously subjecting the oil to the action of electrical current as it passes through said plates.

4. A process of dehydrating emulsified mineral oils, consisting in introducing oil to an elongated vessel, and in causing the oil while in said vessel to pass through a plurality of apertures disposed within plates arranged in said vessel, and in simultaneously subjecting the oil to the action of an electric current as it passes through said apertures.

5. The process of dehydrating emulsified oil, consisting in introducing oil to a vessel, and in passing the oil while in said vessel through a plurality of small nozzles, and in subjecting the oil to the action of an electrical current as it passes through said nozzles.

6. The process of dehydrating emulsified oil, consisting in introducing oil to a vessel, and in passing the oil while in said vessel through a plurality of small nozzles of a gradually increasing diameter, and in subjecting the oil to the action of an electrical current as it passes through said nozzles.

7. The process of dehydrating emulsified mineral oils, which consists in introducing oil to a vessel, in causing the oil in said vessel to pass through openings disposed in a plurality of separated plates, and in subjecting said oil while passing through said apertures to the action of an electrical current.

8. The process of dehydrating emulsified mineral oils, which consists in introducing oil to a vessel, in causing the oil in said vessel to pass through openings disposed in a plurality of separated plates, the openings in the different plates being of progressively changing diameters, and in subjecting said oil while passing through said apertures to the action of an electrical current.

9. In an apparatus of the character described, the combination with an elongated receptacle, means for introducing oil thereto, an oil discharge from said receptacle, a plurality of plates disposed within said receptacle, tapered nozzles carried by said plates and secured thereto through which the oil passes, means for applying an electrical current to each of said plates.

10. In an apparatus of the character described, the combination with an elongated receptacle, means for introducing oil thereto, an oil discharge from said receptacle, a plurality of plates disposed within said receptacle, tapered nozzles carried by said plates and secured thereto through which the oil passes, means for applying an electrical current to each of said plates, the said nozzles in the different plates being of progressively decreasing diameters.

GUSTAV EGLOFF.
HARRY P. BENNER.